United States Patent
Moore

(10) Patent No.: US 7,737,249 B2
(45) Date of Patent: Jun. 15, 2010

(54) DEVOLATILIZATION OF ANHYDRIDE POLYMERS

(75) Inventor: Eugene R. Moore, Midland, MI (US)

(73) Assignee: Cartilast Corporation, Midland, MI (US)

( * ) Notice: Subject to any disclaimer, the term of this patent is extended or adjusted under 35 U.S.C. 154(b) by 0 days.

(21) Appl. No.: 12/381,176

(22) Filed: Mar. 9, 2009

(65) Prior Publication Data

US 2009/0176955 A1 Jul. 9, 2009

Related U.S. Application Data

(63) Continuation-in-part of application No. 11/634,281, filed on Dec. 5, 2006, now abandoned.

(60) Provisional application No. 60/751,087, filed on Dec. 19, 2005.

(51) Int. Cl.
*C08F 6/00* (2006.01)
*C08F 222/08* (2006.01)

(52) U.S. Cl. .................. 528/481; 528/501; 526/75; 526/272; 526/318

(58) Field of Classification Search .......... 528/481, 528/501; 526/272, 75, 318
See application file for complete search history.

(56) References Cited

U.S. PATENT DOCUMENTS

| | | | |
|---|---|---|---|
| 3,437,643 A | | 4/1969 | Zimmerman |
| 3,509,110 A | * | 4/1970 | Giulio et al. ............... 526/272 |
| 3,536,787 A | | 10/1970 | Street |
| 3,919,354 A | | 11/1975 | Moore |
| 3,987,235 A | | 10/1976 | Fujimoto |
| 4,954,303 A | | 9/1990 | Moore |
| 5,380,822 A | | 1/1995 | Skilbeck |

OTHER PUBLICATIONS

E R Moore Properties of Styrene Maleic Anhydride Copolymers, Ind. Eng. Chem. Prod. Res, Dev, 25, 315-321 1986.

* cited by examiner

*Primary Examiner*—Fred M Teskin
(74) *Attorney, Agent, or Firm*—Bernd W Sandy

(57) ABSTRACT

The present invention relates to the formation of low volatile anhydride-containing aromatic vinyl polymers by polymerizing the half ester of the anhydride with a vinyl aromatic monomer followed by devolatilizing the half-ester and reforming the anhydride at elevated temperatures and reduced pressures.

11 Claims, No Drawings

DEVOLATILIZATION OF ANHYDRIDE POLYMERS

This application is a continuation in part of application Ser. No. 11/634,281 filed Dec. 5, 2006, now abandoned, which relies for priority on provisional application 60/751,087 filed Dec. 19, 2005.

FIELD OF THE INVENTION

The present invention relates to improved devolatilization of polymers obtained by the polymerization of vinyl aromatic monomers and unsaturated acid anhydrides, with or without an additional monomer such as acrylonitrile or in the presence of an unsaturated rubber, wherein a chemical derivative of the anhydride is contained in the polymer prior to entering a high temperature zone of a vacuum devolatilization system and to recovering a polymer of low volatile content.

BACKGROUND OF THE INVENTION

In the preparation of polymers of vinyl aromatic monomers, particularly styrene, with maleic anhydride or similar unsaturated anhydrides, by mass or solution polymerization, devolatilization of unreacted monomer, solvent and other volatile components is an absolutely vital step. As polymer technology has progressed, the acceptable level of residual volatile material, particularly as monomer, in a polymer has decreased. While low residual monomer is important for all commercial applications, it is of particular importance in food contact applications, such as containers, where taste and odor contributions to the food are found at relatively low levels. Lower volatile contents also result in improved thermal and mechanical properties. Various means have been employed in the past to reduce volatile content in commercial polymers. However it has not been possible to totally eliminate the volatile content of such polymers.

Multi-polymers, i.e., polymers involving more than one monomer, such as polymers of styrene and maleic anhydride are of particular interest for food contact applications. This interest comes from the increase in heat resistance over polystyrene that results from copolymerization with maleic anhydride. For each added percent of maleic anhydride the heat distortion temperature of the copolymer is increased by nearly 2° C. (Ind. Eng. Chem. Prod. Res. Dev. 1986, 25, 315-321).

Street in U.S. Pat. No. 3,536,787 noted that rubber modified, high impact polystyrene containing 3-5% unreacted styrene could be devolatilized to 2000 ppm of styrene monomer in an extruder devolatilizer system. Street then demonstrated that injection of 0.1% water as a stripping agent, prior to the extruder, lowered the styrene content to 1000 ppm. Generally polymerization to 95-97% conversion level disclosed by Street is not practical because of the long polymerization time required. Further, an extruder devolatilization system is not considered practical for large-scale commercial operations. High capital and operating cost as well as operational problems with vacuum line plugging are among major deterrents to their use.

Fujimoto, in U.S. Pat. No. 3,987,235, discloses a devolatilization by introducing methanol into molten styrene polymer and removing the volatiles under vacuum. However, this route requires a high pressure apparatus for dispersing the methanol into the polymer and an entire additional devolatilization system. This additional system includes a polymer heater, a vacuum chamber with expulsion pump, condenser and other auxiliary equipment.

Skilbeck has shown in U.S. Pat. No. 5,380,822 (which is hereby incorporated by reference to demonstrate the mechanical equipment and steps employed in devolatilization) that a previously devolatilized molten blend of polystyrene and rubber modified polystyrene containing less than 2 weight % residual monomer could be further reduced by dispersing water as a stripping agent into the molten stream and passing it through a vacuum devolatilization system.

Maleic anhydride, MA, can be used as a comonomer to increase heat resistance of polystyrene, but requires intensive mixing during copolymerization. Moore (Ind. Eng. Chem. Prod. Res. Dev. 1986, 25, 315-321) teaches conditions to produce homogeneous copolymers of styrene and 0 to 33% of MA. Moore later demonstrated (U.S. Pat. No. 3,919,354) that high impact copolymers of styrene and MA could be produced in a series of reactors. These copolymers all have Vicat softening points that are about 2° C. above that of homopolymer polystyrene for each added percent of MA.

High degrees of agitation are necessary in order to produce homogeneous copolymers of styrene and MA. If agitation is gradually reduced the first indication of a lack in homogeneity will be a slight haze. Further reduction will produce a cloudy copolymer and a still further reduction will result in an opaque copolymer. In a crystal grade copolymer clarity is of value for most applications. A haze will thus reduce the value of copolymer for most unpigmented applications. Cloudiness will reduce value further and there are relatively few commercial applications that will accept an opaque polymer. Rubber modified styrene/maleic anhydride copolymers are more tolerant of non-homogeneous polymer but will see a loss in impact strength when there is a high degree of non-homogeneity. It is desirable to produce a heat resistant styrene copolymer or terpolymer or rubber modified heat resistant polymer with reduced agitation requirements.

SUMMARY OF THE INVENTION

Two of the most sought after properties for styrene-based polymers are heat resistance and lower residual monomer content. This invention addresses both of these needs in a unique and simple way. At the same time some embodiments of this invention greatly simplify the polymerization problems associated with producing homogenous multi-polymers with unsaturated acid anhydrides such as maleic anhydride. Past art has generally addressed each of these separately. The present invention is based on the discovery that it is possible to reduce agitation requirements of the prior art in the polymerization of vinyl aromatic monomers, such as styrene, and unsaturated acid anhydrides by using half esters of the anhydride with lower molecular weight alcohols and at the same time obtain improved devolatilization of residual styrene with the reformation of the anhydride in the polymer.

More specifically the present invention relates to the preparation of polymers of an ethylenically unsaturated dicarboxylic acid anhydride, having from 4 to 8 carbon atoms, preferably maleic anhydride (MA), with an alkenyl aromatic monomer of 8 to 12 carbon atoms, most commonly styrene, of low residual volatiles, comprising reacting the anhydride with a volatile alcohol having a boiling point lower than that of the vinyl aromatic monomer and particularly styrene and preferably having from 1 to 4 carbon atoms and most preferably being either methanol or ethanol, to form the half ester of the anhydride, polymerizing the half ester with the aromatic vinyl monomer and devolatilizing the resulting polymer at reduced pressures and elevated temperatures until substantially all of the anhydride has been reformed.

Stated alternatively the process of the present invention provides a process for the reduction of residual monomer in polymers of unsaturated anhydrides with a vinyl aromatic monomer, such as styrene, by polymerization with a half ester of the anhydride and the subsequent devolatilization of the polymer with the complete reformation of the anhydride as determined by IR analysis of the ester adsorption band using infrared analysis having a detection limit of about 0.2 weight %. This and other advantages are gained with the use of an in situ generated stripping agent. This "in situ" stripping agent has the advantage of being generated by the gradual release of a short chain alcohol uniformly throughout the polymer when the half ester of the anhydride is converted back to the original anhydride.

Maleic and similar anhydride half esters are easily produced at moderate temperatures (on the order of 60° C.) where equilibrium favors the half ester by direct reaction of the anhydride with a volatile alcohol. At elevated temperatures, however, the anhydride form becomes increasingly favored in an equilibrium reaction. But if enough pressure is maintained to prevent the escape of alcohol, the half-ester form appears to predominate. If the pressure is lowered so as to allow the alcohol to escape the reaction steadily reverses until only the anhydride form remains. As the ester reverses the alcohol is released. Apparently the kinetics of the reverse reaction are slow relative to the rapid speed for the vaporization process that removes the styrene monomer and solvent. This difference in speed allows some alcohol to remain present as the half ester until most of the styrene monomer has vaporized.

This slow release of alcohols boiling below that of that of the vinyl aromatic monomer during the devolatilization step has the surprising but very desirable result of providing a synergistic stripping action. This synergism is particularly strong with the lower molecular weight alcohols such as methanol and ethanol. Since the half esters of interest are liquid at ambient temperatures, problems associated with handling for example molten MA above its melting point are also eliminated. There is the need to maintain all storage, pumping, and piping systems above the 54-56° C. melting point of MA. The high vapor pressure also causes a foul odor, which requires an exhaust system that frequently becomes plugged with condensed MA crystals.

DETAILED DESCRIPTION OF THE INVENTION

The formation of random, homogeneous multi-polymers of aromatic vinyl monomers of 8 to 12 carbons, such as styrene, with MA and similar anhydrides is well known in the art (See U.S. Pat. No. 2,971,939, Ind. Eng. Chain. Prod. Res. Div., 1986, 25, 315-321, which are hereby incorporated by reference). Similarly the formation of rubber modified random polymers of styrene and MA is well known in the art (See U.S. Pat. No. 3,919,354, which is hereby incorporated by reference). The MA content in such polymers generally varies from 0.3 to 33% by weight and preferably from 2 to 25% by weight of the aromatic vinyl monomer and the MA. The rubber content of the rubber modified MA/styrene copolymers generally varies from 5 to 35 parts by weight per 100 parts of the total composition.

In the present invention the saint polymerization conditions for the anhydride can similarly be employed for the half esters of the dicarboxylic acid anhydride. Although styrene is greatly preferred as the vinyl aromatic monomer, other suitable monomers include the various isomers of methyl styrene, and halogenated styrenes. Similarly although maleic anhydride is preferred other unsaturated acid anhydrates such as citraconic anhydride or halogenated maleic acid anhydride can be employed. It is not essential that all of the anhydride be converted to the half ester. At the lower concentrations of the anhydride a higher conversion of the anhydride to the half ester is usually desired to provide the desired improved devolatilization. Generally speaking it is usually desired that the half ester be present in at least 50% of the anhydride composition and hence in a concentration of at least 1 weight % up to 25 weight %. However it is possible to completely convert the anhydride to the half ester. It is furthermore not necessary that the half ester be separately formed, even though such is preferred, and then added to the materials to be polymerized since it is possible to add the alcohol to the monomer composition before polymerization to form the half ester in situ during the polymerization. The reaction of the alcohol with the anhydride occurs on a stoichiometric basis and is achieved by combination of the two ingredient in a stirred reaction vessel at moderate temperatures and can be taken to complete conversion.

The volatile content of the half ester polymers produced in the process of the present invention is generally above 6% and more specifically between 6 and 55% by weight of the polymer produced and depends to a large measure on the polymerization conditions. However the present invention is not limited by any volatile content. The devolatilization employed in the process of the present invention is conducted at temperatures above 180° C. and preferably at temperatures above 200° C. and most preferably in the range of 220 to 270° C. to obtain the removal of volatiles and to reform the anhydride in the polymer. The devolatilization is further enhanced by the released alcohol, which acts as a stripping agent. The devolatilization is further conducted at reduced pressure below atmospheric and preferably at pressures of 2 to 50 mm of mercury.

Although no special equipment is required to conduct the devolatilization, it is generally preferred to first heat the polymer stream exiting from the polymerization reactor to the desired devolatilization temperatures and then passing the resulting polymer melt into a vacuum chamber in which the volatiles are stripped from the polymer and the anhydride is reformed. The resulting devolatilized polymer can then be cooled to room temperature or further fabricated.

Polymerization of the half ester containing anhydrides with a vinyl aromatic monomer preferably takes place in one or a series of recirculated or otherwise agitated reactor. In these reactors the half ester or partial half ester of the anhydride, preferably MA, is added to produce a partial polymer under conditions which will result in a homogeneous random polymer of the anhydride in the polymer chain.

The present invention is further illustrated by the following examples, which are not to be construed as limiting the scope of the invention. Comparative examples demonstrate the improvement resulting from the practice of the present invention.

Comparative Example A

The production of a 5%, by weight of the polymer, maleic anhydride (MA) copolymer with styrene is carried out as described by Moore (Ind. Eng. Chem. Prod. Res. Dev. 1986, 25, 315-321) using the described recirculating reactor at a temperature 126° C. and a solution viscosity of 8 cP (Table 1). As illustrated in the reference, the stream exiting from the polymerization reactor is fed to a heat exchanger where the polymer is brought up to devolatilization temperatures and then through a vacuum chamber operating at 12 mm Hg absolute pressure and 250° C. where devolatilization takes place. The temperature of the exiting polymer is at about 240° C. The feed stream is molten MA and styrene and initially the copolymer being formed is clear. As the run progresses the recirculation pump rate is decreased in stages until a distinct haze is visible in the cooled product. Analysis of the devolatilized polymer shows a residual styrene content in excess of 600 ppm for the whole series of runs.

Example 1

The run of example A is repeated while still at the reduced recirculation rate and the MA feed stream is replaced with equal molar amounts of a liquid stream of the methyl half ester of MA. This ester is formed by placing a stoichiometric amount (one mol MA per mol of methanol) of MA and methanol in a heated chamber (above the melting point of MA) until conversion to the ester exceeds 90% and then adding it to the feed stream into the polymerization reactor. When the polymerization reactor reaches steady state operation, the copolymer of the half ester of MA and styrene is and is transferred to the devolatilization equipment and results in a copolymer of styrene and maleic anhydride that no longer has a detectable haze. Analysis of the polymer following devolatilization shows a residual styrene content below 400 ppm. Approximately 1.6-wt % methanol is calculated to be released in the devolatilizer. Infrared (IR) analysis having a detection limit of about 0.2% for the ester shows the characteristic ester peak to be absent indicating that essentially all of the methyl ester has reverted back to the anhydride. Recirculation is slowed until a haze forms, then increased slightly until the haze disappears Example 2

Example 2 is repeated at the reduced recirculation rate of Example 1 except conversion to the half ester is 50%. Somewhat higher agitation rates than the final rate in example 1 are required to remove the haze. Residual styrene content is again below 400 ppm. No ester linkages or methanol are detected as being present in the copolymer on IR analysis.

Example 3

Example 1 is repeated except molten MA and the stoichiometric amount of methanol are added separately to the polymerization feed stream. Only a slight reduction in recirculation rate is possible before the haze appears. The residual styrene content, after devolatilization however, is again below 400 ppm. It appears that the half ester is formed during the polymerization reaction. This example demonstrates that as long as the half ester is present immediately before the devolatilization step the desired reformation of the anhydride and reduction in volatile content is obtained.

Example 4

Example 1 is repeated except a stoichiometric amount of ethanol is substituted for methanol. Similar reduction in volatile content in the resulting styrene MA copolymer is obtained. IR analysis demonstrates the absence of the half ester.

Comparative Example B

Example 1 is repeated except conditions are adjusted as described by Moore (Ind. Eng. Chem. Prod. Res. Dev. 1986, 25, 315-321) to produce a 25% MA copolymer at a temperature of 80° C. The feed stream is molten MA and initially the copolymer is clear. As the run progresses the recirculation pump rate is again decreased in stages until a distinct haze is visible in the cooled product. Analysis of the polymer shows a residual styrene content in excess of 700 ppm. Special means are employed to remove the viscous polymer from the vacuum chamber at 10 mm Hg. A gear pump with a very wide opening is employed to remove the polymer from the devolatilizer at a temperature of 245° C. A sigma blade device with a smaller gear pump is also capable of removing the viscous polymer from the devolatilizer. Such a device is described by Moore et al in U.S. Pat. No. 4,954,303.

Example 5

In a continuation of the run of comparative example B, at the reduced recirculation rate, the MA feed stream is replaced with a liquid stream of the methanol half ester of MA. When the polymerization reactor reaches steady state operation the copolymer no longer has a detectable haze. Subsequently the recirculation rate is again slowed in several stages before a haze again developed. Analysis of the resulting polymer after devolatilization shows a residual styrene content below 300 ppm regardless of the degree of recirculation. IR analysis again shows the absence of the half ester in the product.

Comparative Example C

The process of example 4 of U.S. Pat. No. 3,919,354 is repeated to produce an impact (rubber modified) styrene copolymer with 19% MA. The Izod impact strength is 2.4 ft-lb/in and the elongation to break is 11%. Homogeneity is controlled in part by the recirculation rate in each of the stages. Recirculation in each of the three stages is decreased in 24-hour steps. A reduced recirculation point is reached where both the impact strength and the elongation to break is more than cut in half. A mechanical devolatilization device is operated at a reduced pressure of 10 mm Hg and the polymer exits the device at a temperature of 250° C. Residual styrene monomer remains above 600 ppm for the whole series of runs Example 6

In a continuation of the run of Example C at the reduced recirculation, the MA feed stream is replaced with a liquid, stream of the ethyl half ester of MA formed as in Example 1. When the polymerization reactor reaches steady state operation, at the reduced recirculation rates, the styrene-MA copolymer (containing 19% MA) regains the Izod impact strength and elongation of the copolymer of example 4 of U.S. Pat. No. 3,919,354. The product, however now shows a more desirable residual styrene content below 400 ppm and IR analysis shows the absence of the ester in the product.

Example 7

Example 6 is repeated except the n-propanol ester is used in place of the ethyl ester. Again the resulting styrene/MA copolymer shows the anhydride to have been reformed and no ester is detected in the product by IR analysis.

These examples illustrate several of the advantages of this invention. Most important of these advantages is the surprising reduction in residual monomer. Also it is seen that the equipment required to handle MA is greatly simplified by the use of the half ester since the half ester is liquid at ambient conditions while MA is solid. It is further seen that less agitation is required when polymerizing the half ester than with MA. This is important because many commercial reactors are not capable of the high degrees of agitation used by Moore (Ind. Eng. Chem. Prod. Res. Dev. 1986, 25, 315-321). It is also to be noted that increased level of MA results in an increase in stripping agent and thus lower volatile content. Again the equipment required to obtain even high content copolymers of styrene and MA is greatly simplified by the use of the half ester since the half ester is liquid at ambient conditions. Also it is further seen that less agitation is required when polymerizing the half ester.

What is claimed is:

1. A process for the devolatilization of a polymer of styrene with an unsaturated dicarboxylic acid anhydride of 4 to 8 carbon atoms having low volatiles, which comprises forming a copolymer of styrene with the half ester of a volatile alcohol of 1 to four carbon atoms and having a boiling point below that of styrene monomer with the anhydride of the unsaturated dicarboxylic acid in a polymerization reactor, said copolymer having from 6 to 55 wt % of a volatile organic content, subjecting the resulting copolymer to devolatilization at temperatures between 200 to 260° C. under reduced pressure conditions until the half ester content is below 0.2% as measured by IR, and recovering a polymer of styrene and the dicarboxylic acid anhydride having a styrene content of less than 400 ppm.

2. The process of claim 1 wherein the anhydride is maleic anhydride.

3. The process of claim 2 wherein the maleic anhydride content is from 0.5 to 25% by weight of the polymerized anhydride and styrene.

4. The process of claim 3 wherein the alcohol is methanol or ethanol.

5. The process of claim 1 wherein greater than 50% of the anhydride groups are convened to the half ester.

6. The process of claim 2 wherein the polymer is formed in the presence of 0.5 to 35% by weight of the total mixture of an unsaturated rubber.

7. The process of claim 1 wherein the polymer of the half ester and styrene is devolatilized at temperatures of 220 to 260° C. and at pressures between 2 and 50 mm of mercury.

8. The process of claim 2 wherein the half ester of the maleic anhydride and the alcohol is formed in situ in the polymerization reactor.

9. The process of claim 8 where the alcohol is methanol, ethanol or isopropanol.

10. The process of claim 8 wherein a devolatilization heater and a vacuum chamber is used in the devolatilization.

11. The process of claim 10 where the temperature of the polymer leaving the devolatilization heater is between 200 and 260° C.

* * * * *